US009673595B2

(12) United States Patent
Benke et al.

(10) Patent No.: US 9,673,595 B2
(45) Date of Patent: Jun. 6, 2017

(54) WITHDRAWABLE CONTACTOR TRUCKS WITH INTEGRAL MOTORIZED LEVERING-IN, RELATED SWITCHGEAR, KITS AND METHODS

(71) Applicant: Eaton Corporation, Cleveland, OH (US)

(72) Inventors: James Jeffery Benke, Pittsburgh, PA (US); Wang YiFeng, Changshu (CN); Ye LiPing, Changzhou (CN)

(73) Assignee: Eaton Corporation, Cleveland, OH (US)

( * ) Notice: Subject to any disclaimer, the term of this patent is extended or adjusted under 35 U.S.C. 154(b) by 496 days.

(21) Appl. No.: 14/068,463

(22) Filed: Oct. 31, 2013

(65) Prior Publication Data

US 2015/0114807 A1 Apr. 30, 2015

(51) Int. Cl.
*H05K 5/00* (2006.01)
*H02B 11/167* (2006.01)
*H02B 11/127* (2006.01)

(52) U.S. Cl.
CPC ......... *H02B 11/167* (2013.01); *H02B 11/127* (2013.01)

(58) Field of Classification Search
None
See application file for complete search history.

(56) References Cited

U.S. PATENT DOCUMENTS

| | | | |
|---|---|---|---|
| 8,283,585 B2* | 10/2012 | Capelli | 200/50.23 |
| 8,288,669 B2 | 10/2012 | Capelli | |
| 9,490,612 B2* | 11/2016 | Hanna | H02B 11/127 |
| 2008/0094782 A1* | 4/2008 | Mason | H02B 11/127 361/609 |
| 2011/0147173 A1* | 6/2011 | Lee | H02B 11/127 200/50.25 |
| 2011/0216508 A1 | 9/2011 | Faulkner et al. | |
| 2012/0055765 A1* | 3/2012 | Zylstra | H02B 11/127 200/50.24 |
| 2014/0151207 A1* | 6/2014 | Rodgers | H01H 3/06 200/335 |

FOREIGN PATENT DOCUMENTS

| | | |
|---|---|---|
| CN | 202142798 | 2/2012 |
| DE | 19803476 | 10/1999 |
| WO | WO2012/103681 | 8/2012 |

(Continued)

OTHER PUBLICATIONS

Eaton Cutler-Hammer, Instructions for 5/15 kV Metal-Enclosed Front Access (MEF) Switchgear Indoor Housing, Mar. 2006, 28 pages.

(Continued)

*Primary Examiner* — Courtney Smith
*Assistant Examiner* — Rashen E Morrison
(74) *Attorney, Agent, or Firm* — Myers Bigel, P.A.

(57) ABSTRACT

Withdrawable contactor trucks for a circuit breaker have a cradle with a motorized drive system comprising an electric motor in the cradle. The motorized drive system is configured to move the contactor truck in a controlled path between a withdrawn position and a levering-in position in a switchgear compartment.

20 Claims, 19 Drawing Sheets

(56) References Cited

FOREIGN PATENT DOCUMENTS

WO     WO2013/139275     9/2013
WO     WO2013/143415     10/2013

OTHER PUBLICATIONS

Eaton, W-SLC Medium Voltage fused contractor truck, A safe, reliable and efficient motor starter, Product Brochure, Jan. 2013, 12 pages.
Siemens, Medium-Voltage Switchgear, Operating Instructions, Mar. 31, 2010, 115 pages.
European Search Report for Corresponding EP Application No. 14188948.5, date Mar. 5, 2015, 10 pages.

* cited by examiner

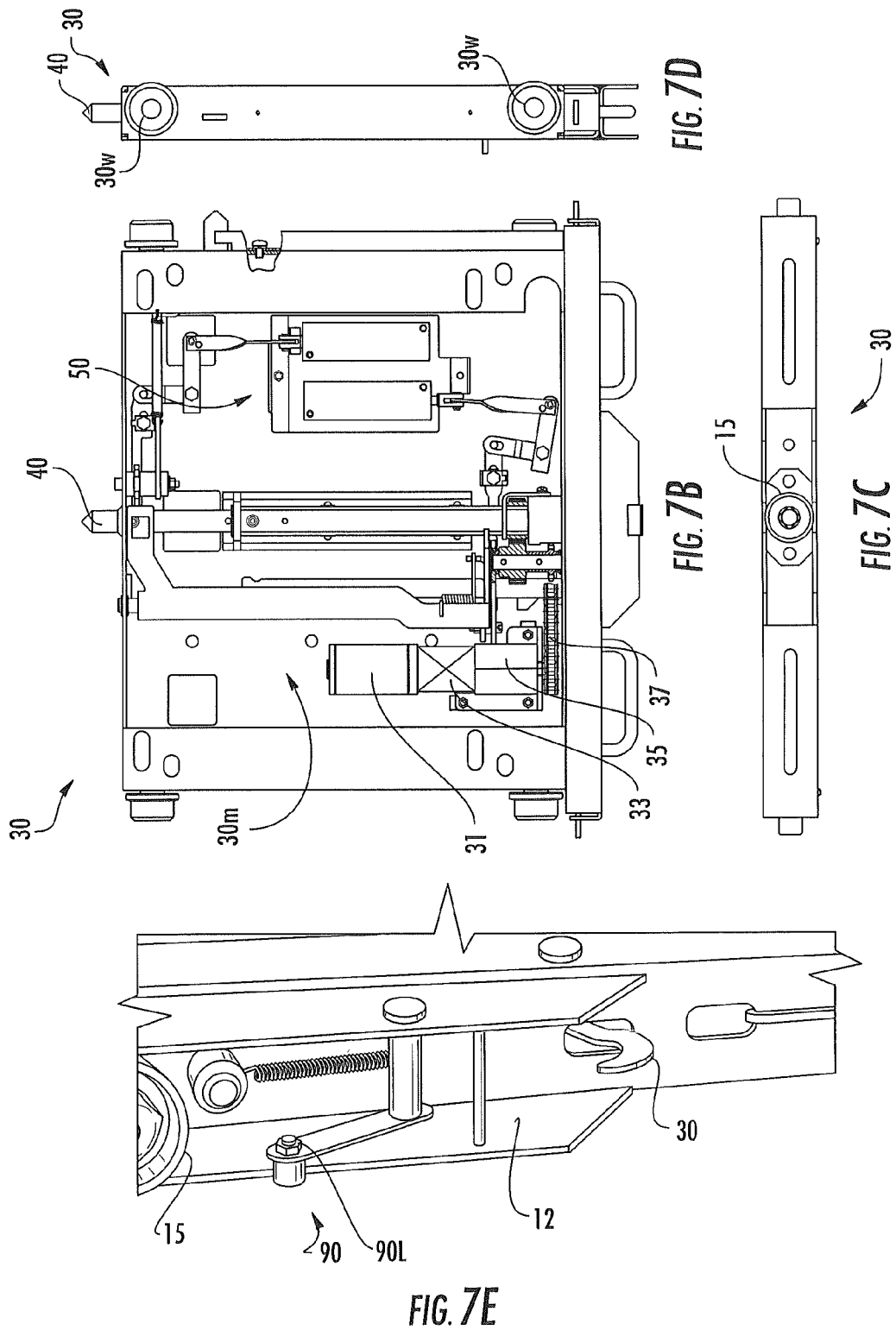

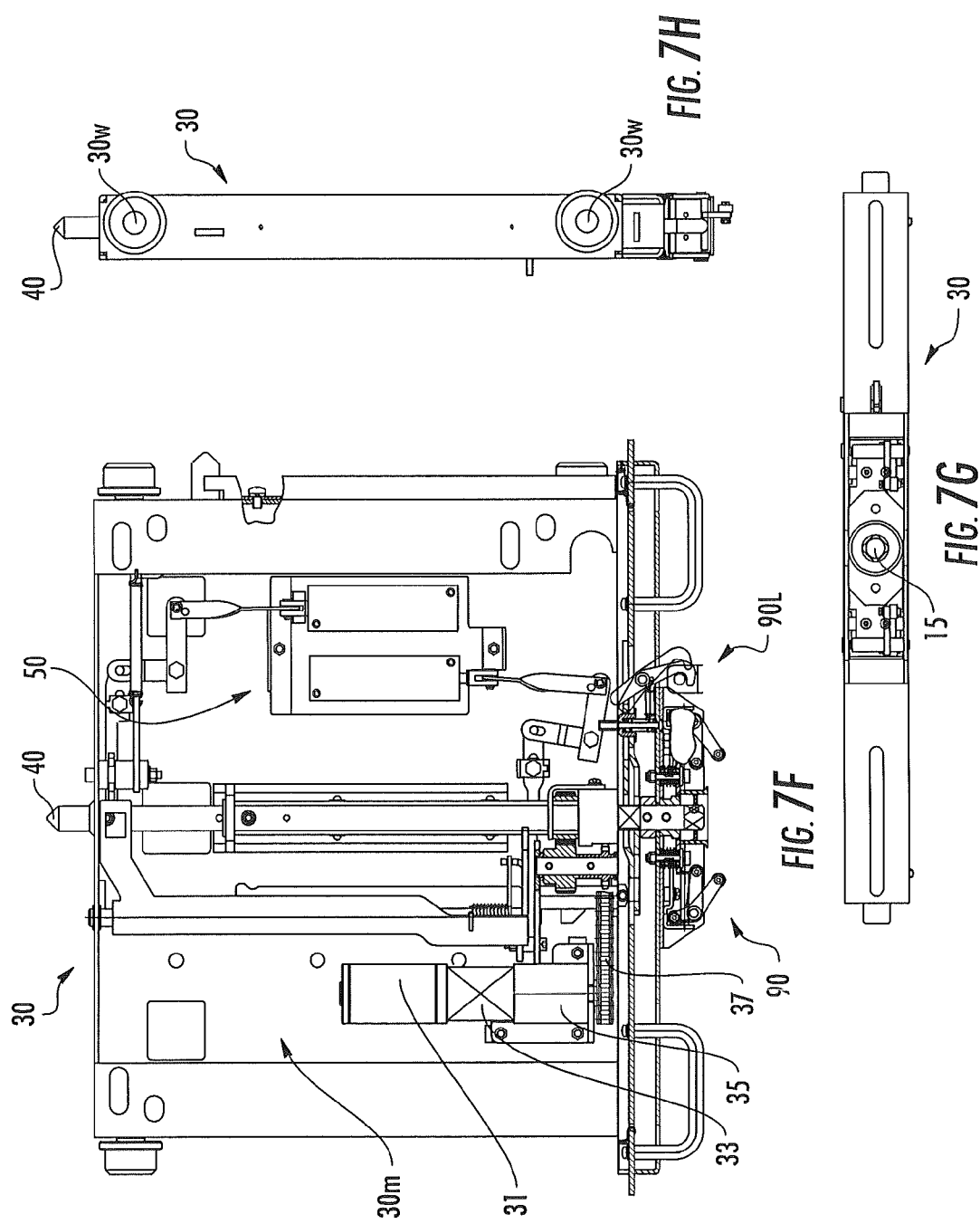

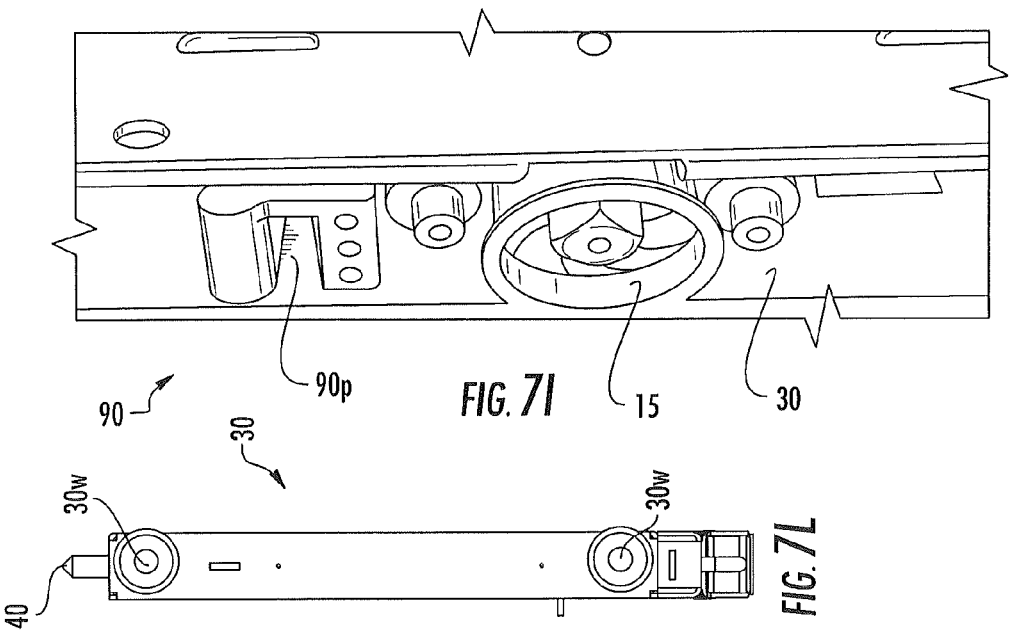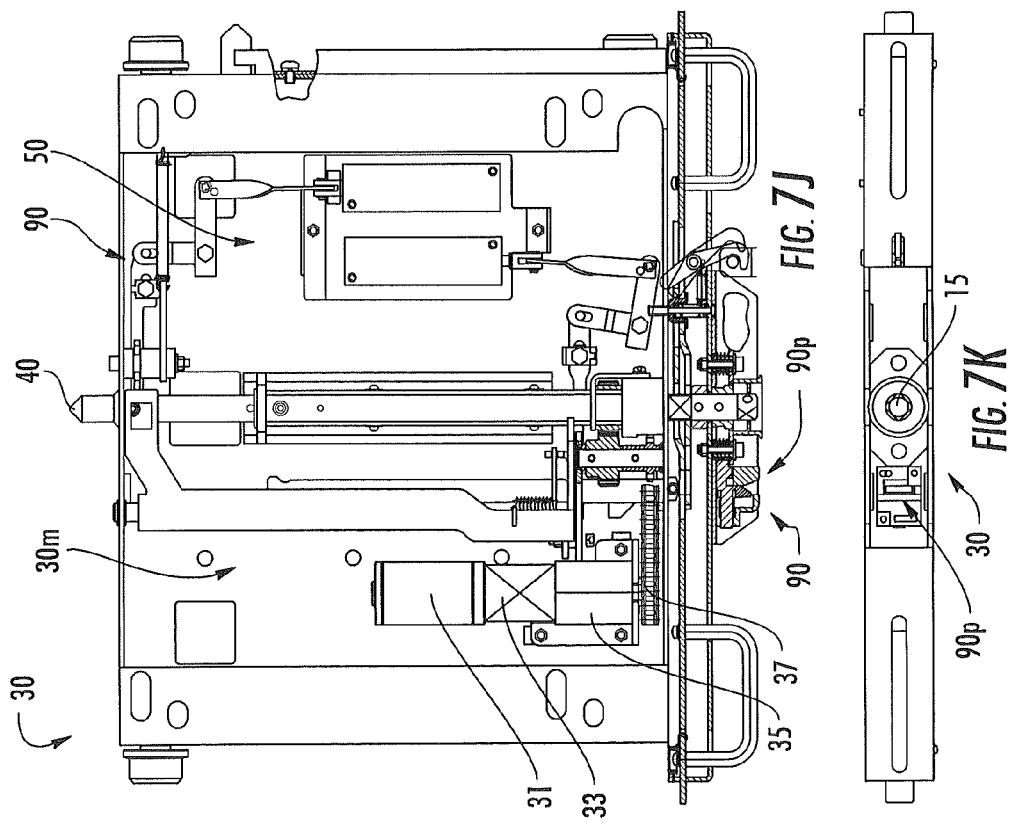

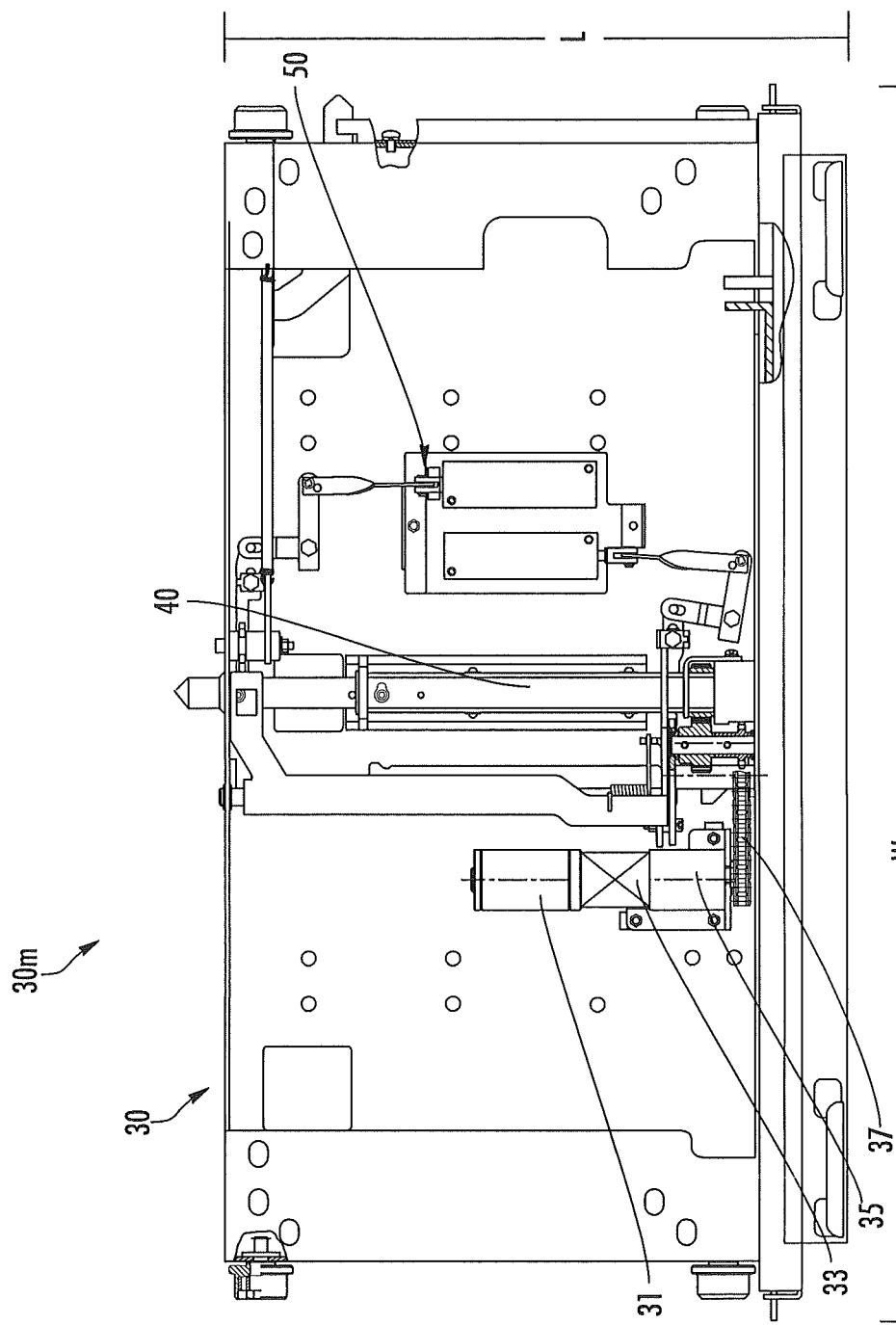

WITHDRAWABLE CONTACTOR TRUCKS WITH INTEGRAL MOTORIZED LEVERING-IN, RELATED SWITCHGEAR, KITS AND METHODS

FIELD OF THE INVENTION

The present invention relates to circuit breakers.

BACKGROUND OF THE INVENTION

Electric switchgear is well known to those of skill in the art. The switchgear may be configured within a housing with at least one compartment provided with a door and electrical conductors adapted for connection to a load. The switchgear may be mounted on a withdrawable (aka, "draw out") contactor truck.

An example of such a truck 10 is shown in FIG. 1. The truck 10 is movable inside the compartment between a connected position and a withdrawn position. Each phase of the switching device is electrically connected to a corresponding electrical conductor in the connected position. In the withdrawn position, each phase of the switching device is electrically separated from the corresponding electrical conductor. During movement of the switching device between the connected position and the withdrawn position, the main contacts are kept electrically separated.

Typical medium voltage (MV) withdrawable contactors have a standard levering-in cradle that requires a user to hand crank the component into the switchgear. This places the user in front of the switchgear. Some switchgear units have external motors that mount outside the switchgear door but these components can be cumbersome and relatively heavy.

There remains a need for alternate contactor truck configurations.

SUMMARY OF EMBODIMENTS OF THE INVENTION

Embodiments of the invention are directed to withdrawable contactor trucks for a circuit breaker. The trucks have a cradle with a motorized drive system with an electric motor in the cradle. The motorized drive system is configured to move the contactor truck in a path between a withdrawn position and a levering-in position in a switchgear compartment.

Some embodiments are directed to withdrawable contactor trucks for a circuit breaker. The trucks include a cradle; and a motorized drive system that includes an electric motor in the cradle. The motorized drive system is configured to move the contactor truck in a path between a withdrawn position and a levering-in position in a circuit breaker.

The motorized drive system can include a levering-in drive screw held in the cradle in communication with the electric motor. The levering-in drive screw can extend in a horizontal orientation along a longitudinally extending centerline of the cradle.

The cradle can have a height dimension that is between about 1.5 and 6 inches. The electric motor that has a body that resides under the height dimension of the cradle.

The withdrawable contactor truck can be for an electric switchgear. The contactor truck can include a switchgear door interlock held by a front portion of the cradle.

The motorized drive system can include a clutch held in the cradle in communication with the motor to be able to make the motorized drive system controllably travel in forward and reverse directions.

The motorized drive system can include: (a) a gear box held in the cradle attached to a clutch; (b) a drive linkage or belt in the cradle attached to the gear box; and (c) a levering-in drive screw that is in communication with the drive linkage or belt.

The truck can be in communication with an onboard and/or remote controller in communication with the motorized drive system for allowing a user to remotely control the motorized drive system to direct the motorized drive system to move to the withdrawn position and the levering-in position.

The contactor truck can include at least one position sensor held in the cradle in communication with the motorized drive system.

The contactor truck can include a multi-phase switching device fixedly attached to the cradle. The switching device can reside over the cradle.

Other embodiments are directed to a cradle for withdrawable contactor trucks. The cradle include a cradle housing having upstanding sidewalls and an electric motor held in the cradle.

The cradle can include a levering-in drive screw held in the cradle in communication with the electric motor. The levering-in drive screw can extend in a horizontal orientation along a longitudinally extending centerline of the cradle.

The cradle has a height dimension that can be between about 1.5 inches and 6 inches. The electric motor can have a body that resides under the height dimension of the cradle The cradle can include a clutch held in the cradle in communication with the electric motor.

The cradle can include: a gear box held in the cradle attached to a clutch; a drive linkage or belt in the cradle attached to the gear box; and a levering-in drive screw that is in communication with the drive linkage or belt.

The cradle can be in communication with at least one controller that is in communication with the electric motor for allowing a user to remotely control the motor to direct cradle to move between a withdrawn position and a levering-in position in a circuit breaker.

The cradle can include at least one position sensor held in the cradle in communication with the drive screw.

Still other embodiments are directed to electric switchgears. The switchgears include: (a) a housing having at least one interior compartment and a door; (b) a withdrawable contactor truck comprising a cradle, a motorized drive system with an electric motor in the cradle and a multi-phase switching device held above the cradle; and (c) at least one controller remote from the contactor truck in communication with the motorized drive system. The motorized drive system can be configured to move the contactor truck in a path between a withdrawn position and a levering-in connected position in the switchgear housing interior compartment, such that (i) in the levering-in connected position, each phase of the switching device is electrically connected to a corresponding electrical conductor and (ii) in the withdrawn position, each phase of the switching device is electrically separated from the corresponding electrical conductor.

Yet other embodiments are directed to methods of moving a withdrawable contactor truck having a cradle inside an electric switchgear. The methods include: (a) accepting user input on a controller to remotely select between withdrawable and levering-in positions; and in response to the user input (b) electronically directing the withdrawable contactor truck to move to the levering in position or the withdrawn position in a switchgear compartment using an electric motor held inside the cradle.

The electronically directing can be carried out using the controller, which can be an analog or electronic controller, to control motion of the contactor truck so that the contactor truck is able to move to the levering-in position within about 1-300 seconds.

The electric motor can be in communication with a clutch that is in communication with a drive system that moves the contactor truck.

The method can include: electronically monitoring a position of the cradle and/or truck in the switchgear using at least one position sensor attached to the cradle and/or contactor truck; and configuring the clutch to slip if excessive forces or loads are detected.

Yet other embodiments are directed to methods of fabricating a cradle assembly for a withdrawable contactor truck. The methods include: providing a cradle; and
placing an electric motor in the cradle.

The methods may also include attaching a clutch to the electric motor before or after the placing step and placing the clutch in the cradle adjacent the electric motor.

Still other embodiments are directed to kits for retrofit or upgrade of a contactor truck. The kits include a cradle having a motorized drive system with an electric motor held therein for levering-in the contactor truck.

The motorized drive system of the kit can include a levering-in drive screw held in the cradle in communication with the electric motor. The levering-in drive screw can extend in a horizontal orientation along a longitudinally extending centerline of the cradle.

The cradle has a height dimension that can be between about 1.5 inches and about 6 inches.

The electric motor can have a body that resides under the height dimension of the cradle.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 7B is top view of a cradle having the no door interlock configuration according to some embodiments of the present invention.

FIG. 7C is a front view of the cradle shown in FIG. 7B.

FIG. 7D is a side view of the cradle shown in FIG. 7B.

FIG. 7E is a partial view of a lower front portion of contactor truck illustrating a lever door interlock configuration according to embodiments of the present invention.

FIG. 7F is top view of a cradle having the lever door interlock configuration according to some embodiments of the present invention.

FIG. 7G is a front view of the cradle shown in FIG. 7F.

FIG. 7H is a side view of the cradle shown in FIG. 7F.

FIG. 7I is a partial view of a lower front portion of contactor truck illustrating a pin door interlock configuration according to embodiments of the present invention.

FIG. 7J is top view of a cradle having the pin door interlock configuration according to some embodiments of the present invention.

FIG. 7K is a front view of the cradle shown in FIG. 7J.

FIG. 7L is a side view of the cradle shown in FIG. 7J.

FIGS. 8A-8C are schematic top view illustrations of different cradle base assemblies for different rated voltages according to embodiments of the present invention.

FIG. 11 is a schematic of an exemplary circuit for motorized levering-in operation according to embodiments of the present invention.

DETAILED DESCRIPTION OF EMBODIMENTS OF THE INVENTION

Figure 1:
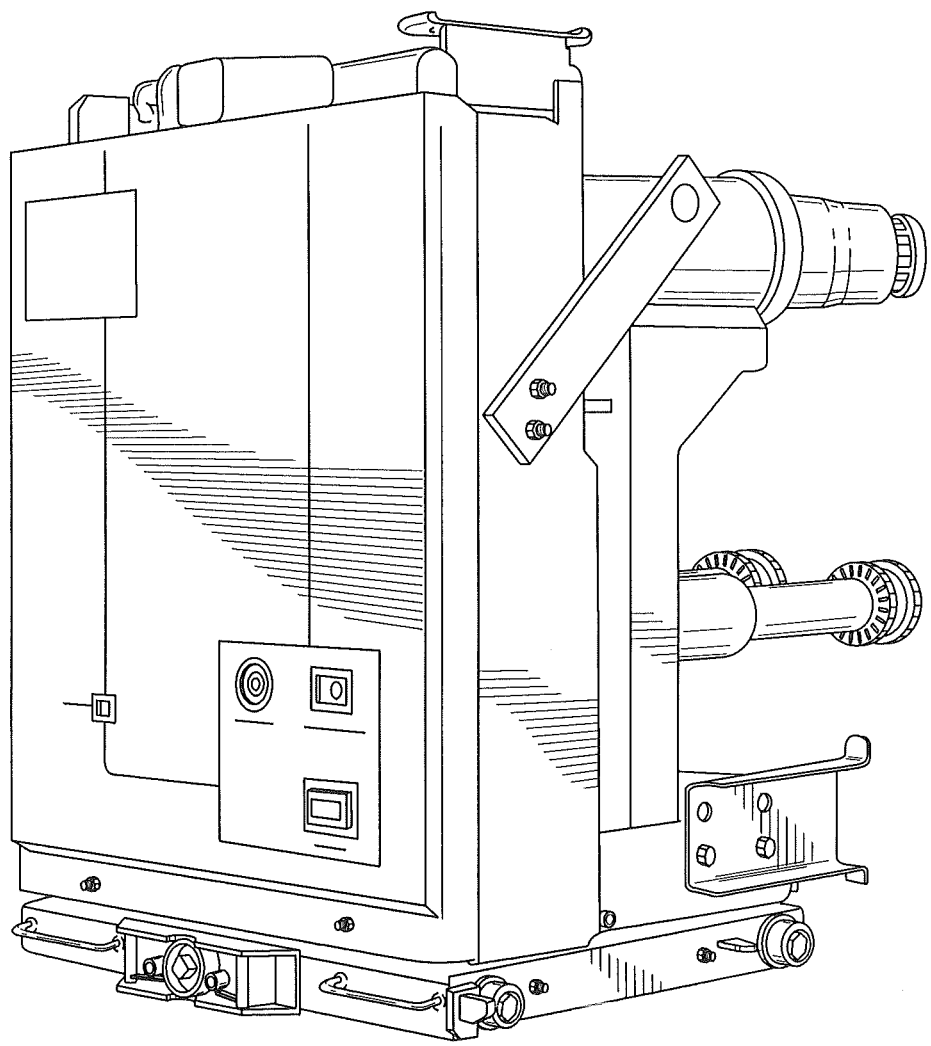
FIG. 1 is a side perspective view of a prior art W-SLC contactor truck with a standard levering-in cradle (which uses a hand crank to position the cradle in a switchgear).

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Broken lines in the flow charts represent optional features or steps.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The term "circuit" refers to an entirely hardware embodiment or an embodiment combining software and hardware aspects, features and/or components (including, for example, at least one processor and software associated therewith embedded therein and/or executable by and/or one or more Application Specific Integrated Circuits (ASICs), for programmatically directing and/or performing certain described actions or method steps). The circuit can reside in one location or multiple locations, it may be integrated into one component or may be distributed, e.g., it may reside entirely in a workstation, handcart, switchgear, motor control center (MCC) cabinet or single computer, partially in one workstation, handcart, switchgear, MCC cabinet, or computer, or totally in a remote location away from a workstation, handcart, switchgear, MCC cabinet or other device.

Figure 2:
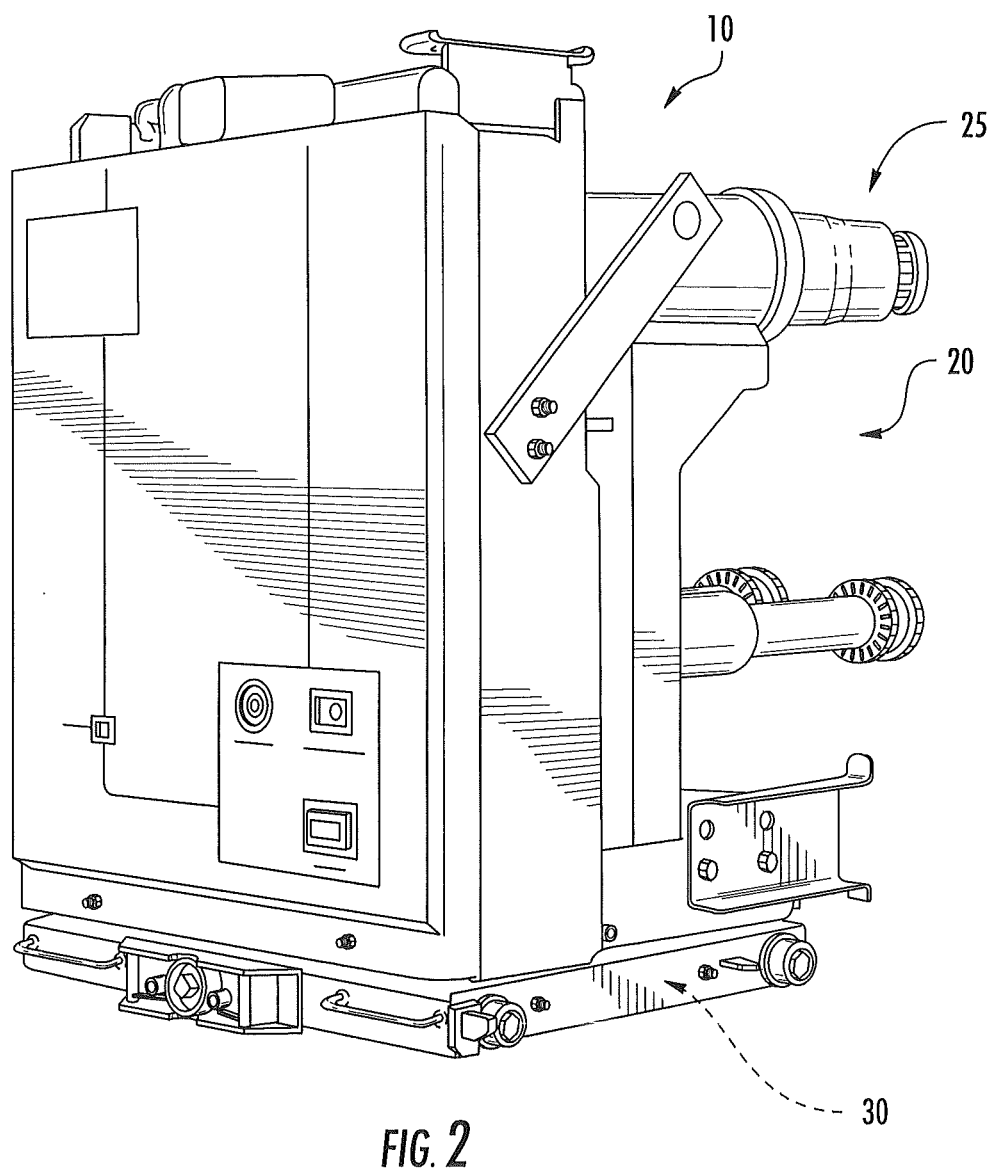
FIG. 2 is a side perspective view of a contactor truck with an integrated motor according to embodiments of the present invention.
Figure 3:
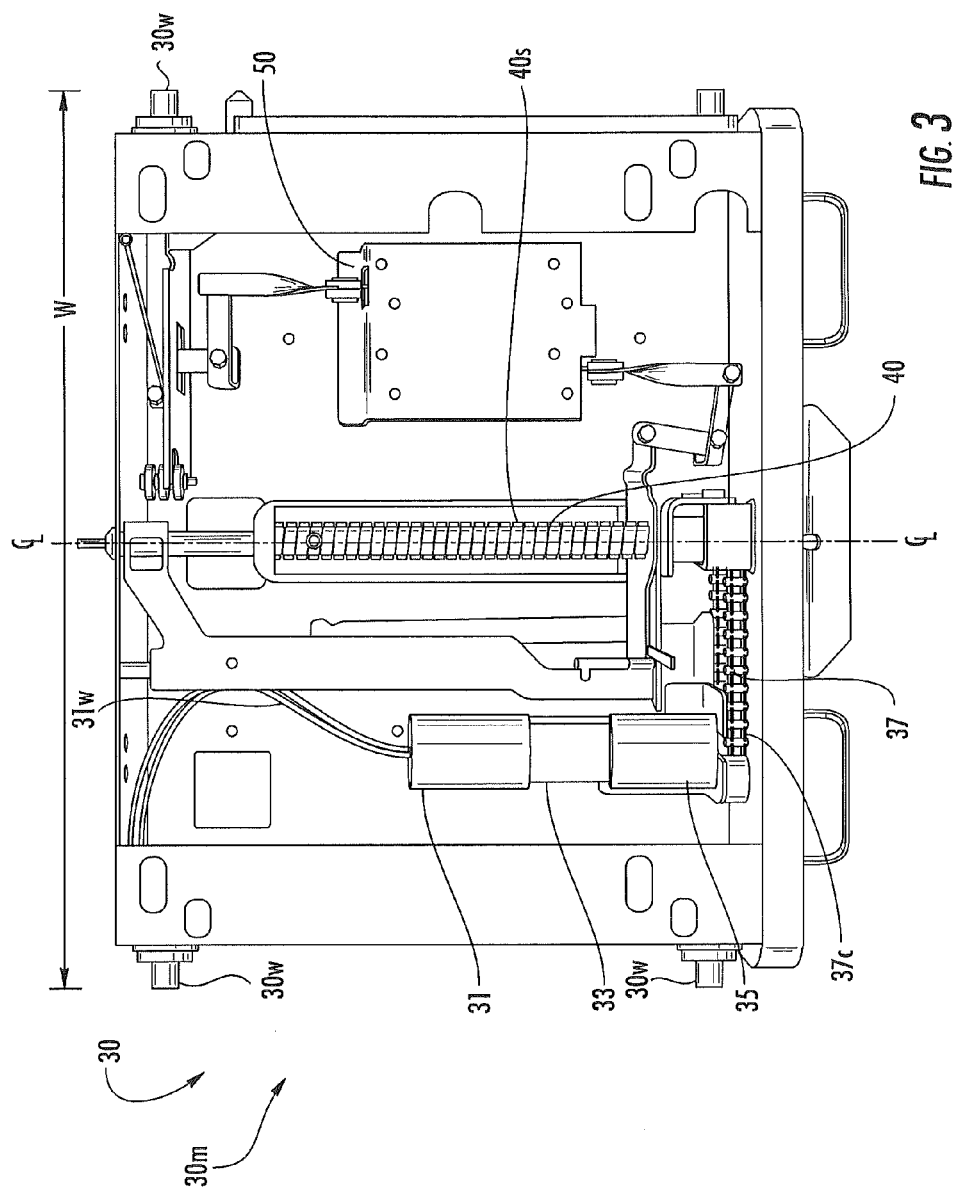
FIG. 3 is a top view of a cradle base assembly used in contactor trucks according to embodiments of the present invention.
Figure 4A:
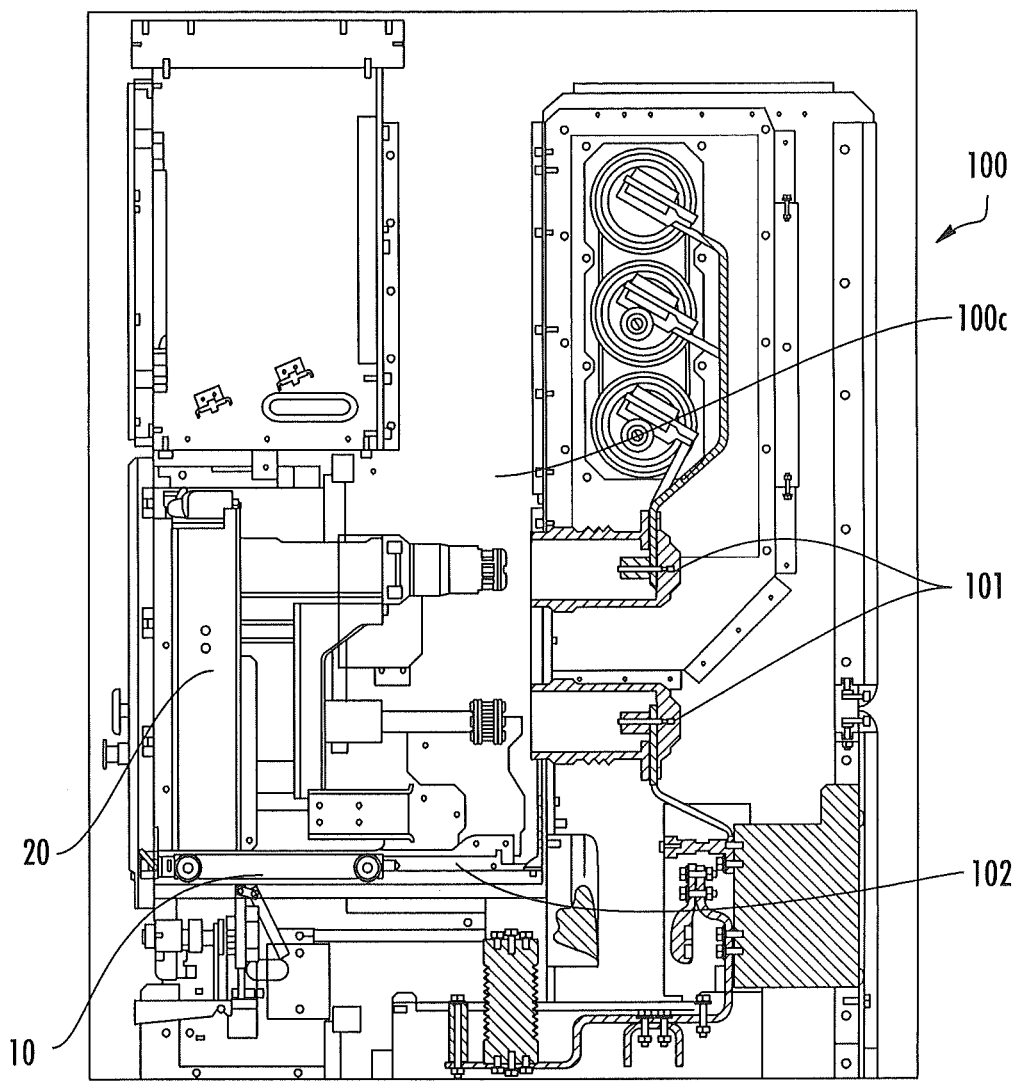
FIG. 4A is a partial cutaway side view of the contactor truck in a test position according to embodiments of the present invention.
Figure 4B:
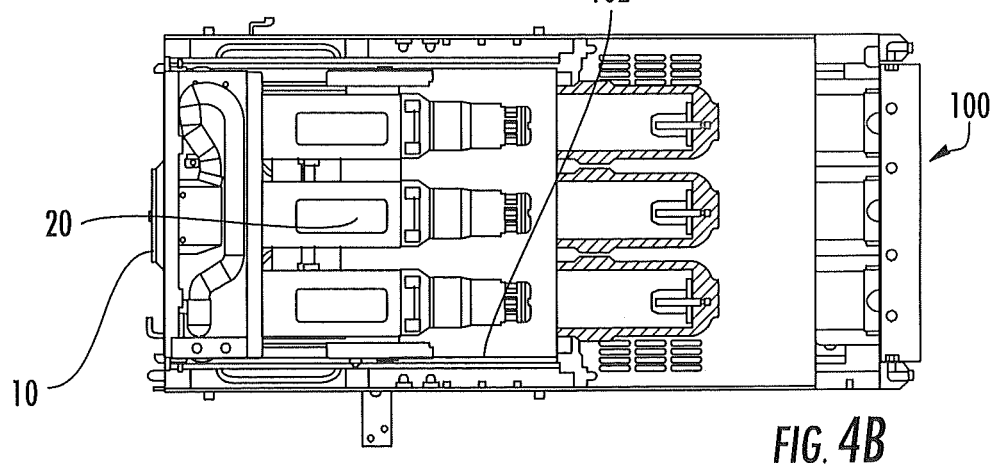
FIG. 4B is a top view of the contactor truck in the test position shown in FIG. 4A.
Figure 5A:
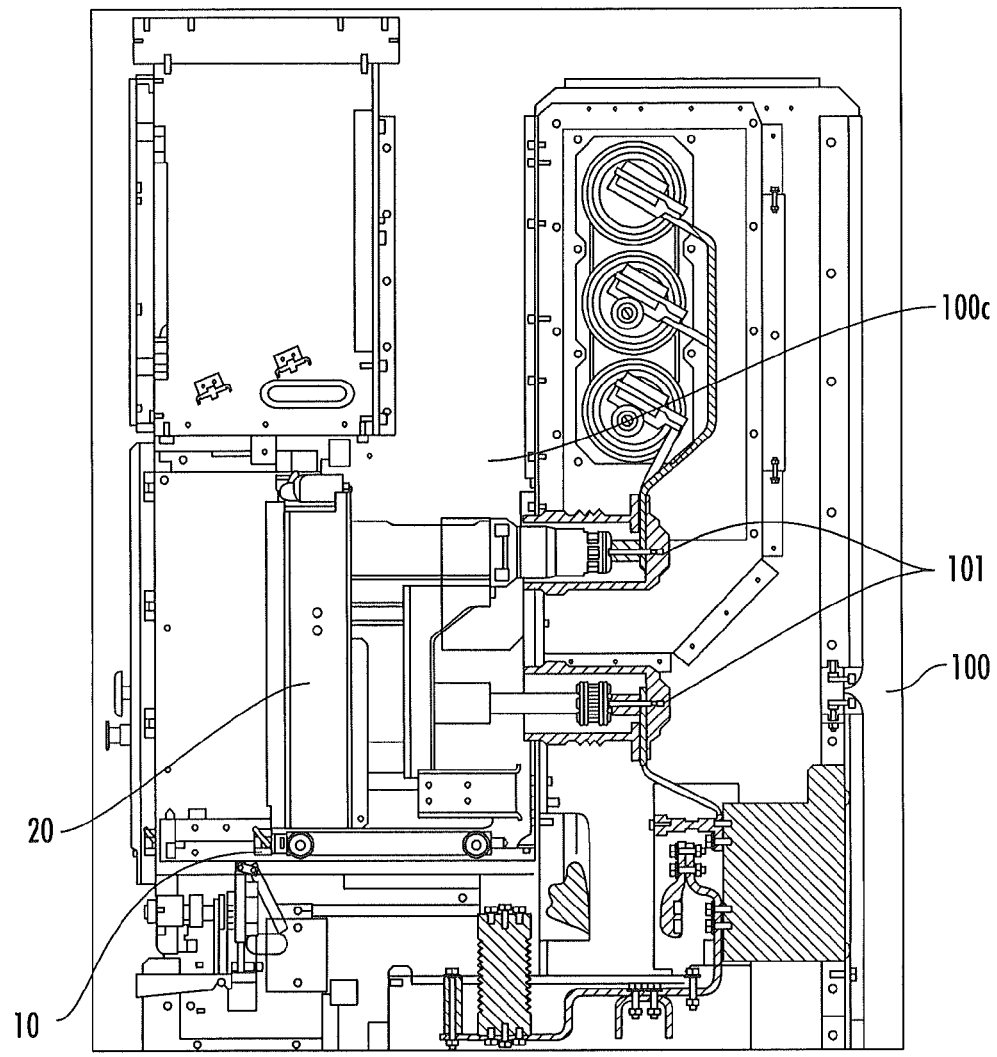
FIG. 5A is a partial cutaway side view of the contactor truck in a service position according to embodiments of the present invention.
Figure 5B:
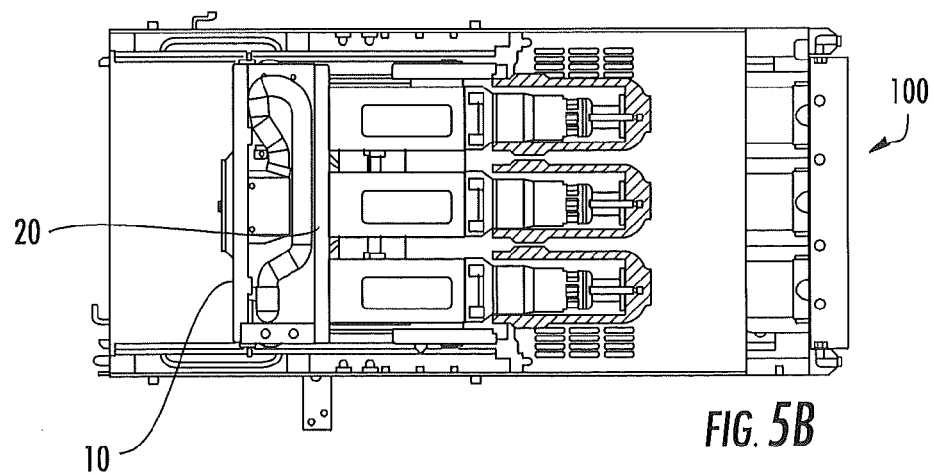
FIG. 5B is a top view of the contactor truck in the service position shown in FIG. 5A.

Referring now to FIGS. 2 and 3, a contactor truck 10 with a switching device 20 comprising current interrupters 25, typically a multi-phase switching device, is held by a cradle 30 to be movable inside a compartment 100c (FIG. 4A) for an electric circuit breaker or switchgear 100 (FIGS. 4A, 5A). The movement can comprise movement between a connected position (FIGS. 5A, 5B) and a withdrawn position (FIGS. 4A, 4B). As is well known to those of skill in the art, in the connected (service) position, each phase of the switching device is electrically connected to a corresponding electrical conductor 101 while in the withdrawn (test) position, each phase of the switching device 25 is electrically separate from a corresponding electrical conductor 101.

As shown in FIG. 3, the cradle 30 has a motorized levering-in system 30m that can include an onboard motor 31 that powers a drive system 40, e.g., a levering-in (worm) screw 40s. The motor 31 can be connected to a clutch 33 and gear box 35 that can direct the drive system 40 to selectively move in forward and reverse directions between, for example, "rack in" (FIG. 5A) and "rack out" (FIG. 4A) positions. The cradle 30 can include a mounting bracket 39 that holds the drive system 40 (such as the worm screw) in position, in cooperating alignment with the drive system 30m. The drive system 40 can comprise other configurations from the exemplary worm gear shown, including other gear systems, linkages, and the like.

In some embodiments, the gear box 35 can be connected to the drive system 40 directly or indirectly using any suitable drive assembly 37. In the embodiment shown, a chain drive gear system 37c is configured to turn the levering-in screw 40s in response to the direction powered by the motor and clutch. However, belt drives, or direct gear (rack and pinion), planetary or other drive systems may be used.

The motor 31 can be at least one electric motor. Although shown as one motor more than one motor can be used. Where more than one motor is used, they can cooperate to drive the system or one can lever-in and the other can lever out.

The motor 31 can be an AC or DC motor. In some embodiments, the motor 30 can be a servo motor, a linear motor, a slot motor or other suitable motor. The motor voltage can be any suitable voltage, such as, for example, 24V DC, 48V DC, 60V DC, 110V DC, 125 V DC, 220 V DC, 250V DC, 120 AC, 220 AC, 230 AC or 240 AC. The electric motor 31 can comprise other motor drive technologies and linear drive elements, e.g., stepper motors, an AC motor with VFD (variable frequency drive), an induction motor with a feedback encoder and a VFD drive, ball screws, chain drives and rack and pinion drives and the like. Where a servo motor is used, the drive system 30m may operate using motor feedback in a control system. This feedback can be used to detect unwanted motion, adjust speed and/or to monitor the accuracy of the commanded motion. The feedback can be provided by an encoder or sensor. The term "servo drive" refers to a drive system that controls the servo motor. Generally stated, the servo drive transmits electric current to the servo motor in order to produce motion proportional to the command signal. A command signal can represent a desired velocity, acceleration or deceleration, but can also represent a desired torque or position. The servo motor can have one or more sensors that report the motor's actual status back to the servo drive. The servo drive can adjust the voltage frequency and/or pulse width to the motor so as to correct for deviation or drift and the like.

The levering in system 30m can be configured to have sufficient torque to drive the truck unit fully into the switchgear position (e.g., from the position shown in FIG. 4A to the position shown in FIG. 5A) within about 1-300 seconds. The clutch 33 can be configured to give/slip when an excessive (predefined) force is applied to the components. The clutch 33 can slip/give at a force defined so that the components will not bend or break. The breaker weight varies by frame size. The lightest frame weight is about 100 pounds and the heaviest is about 600 pounds.

The cradle 30 can have a low profile and be compact to be suitable for field upgrade and/or retrofit to existing contactor trucks (e.g., for existing W-VACi breakers or switchgear). The cradle 30 can have a depth/height dimension that is between about 1 inch and 18 inches, including between about 1.5-6 inches height. In some embodiments the cradle 30 has a height that is, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, and about 7 inches.

The cradle 30 can include electrical wires 31w for powering the motor 31. The wires 31w can be routed to at least one controller 80 (FIGS. 9A, 9B, 12) such as a main unit controller 80m that may reside on an external surface or wall of the switchgear 10 and/or a handcart or other remote controller 80h that may be remote from the switchgear 10. The remote controller 80h can be hard-wired or wirelessly connected to the components (e.g., motor 31, clutch 33 and position sensor 50) in the levering-in cradle 30.

Still referring to FIG. 3, the cradle 30 can include at least one position sensor 50 that can be used to control the powering of the motor 31 to facilitate proper levering-in and withdrawal. The position sensor 50 can be a contacting or non-contacting position sensor 50. The at least one position sensor 50 can provide data to measure linear or angular position in reference to a fixed point or arbitrary reference. The at least one position sensor 50 can be used to measure distance or displacement (change in position) or simply to detect the presence or absence of an object. The position information can then be processed with a circuit to count events, monitor physical conditions, control travel distance or speed. For example, if the position or proximity information is combined with time measurements, then speed, velocity, and acceleration can be calculated for motion control. Although shown as a position indicator or proximity switch, other position sensors can be used including, for example, photoelectric or optical sensors, capacitive sensors, inductive sensors, ultrasonic sensors, magnetic sensors, a limit switch, a linear variable differential transformer (LVDT) and encoders, for example.

As also shown in FIG. 3, the cradle 30 can include rollers or wheels 30w that can ride on a support surface 102 (FIG. 4A) of a rack (e.g., shelf) in the circuit breaker or switchgear 100.

The motorized drive system 30m can be configured so that the levering-in drive screw 40 extends in a horizontal orientation along a longitudinally extending centerline (C/L) perpendicular to a width dimension W that of the cradle 30.

Figure 6A:
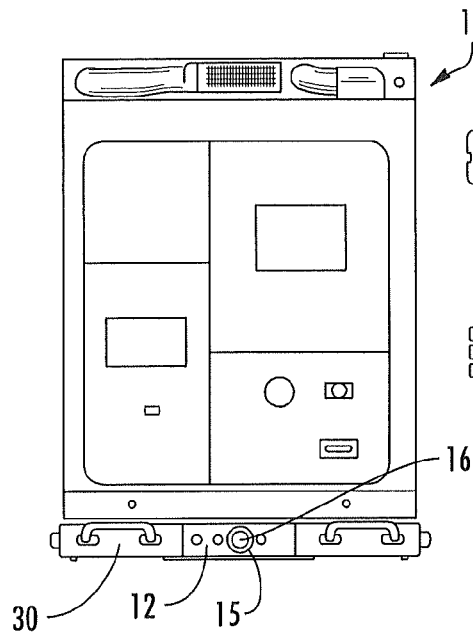
FIG. 6A is a front view of a contactor truck according to some embodiments of the present invention.
Figure 6B:
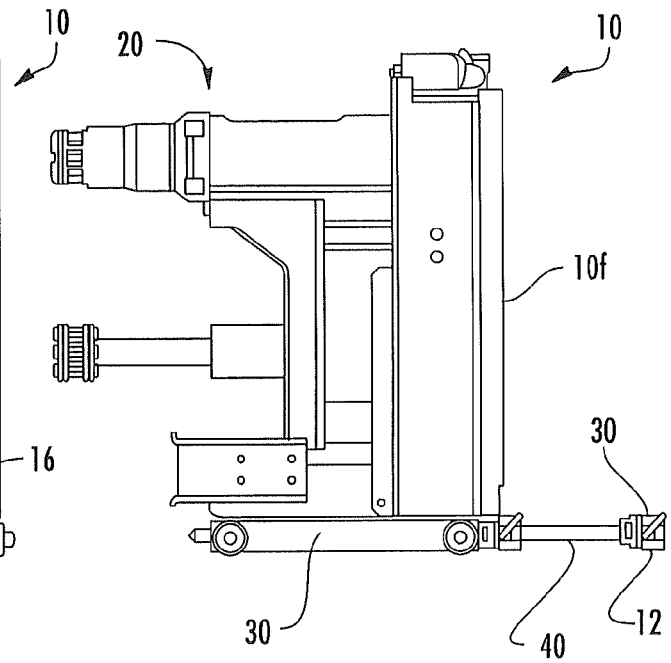
FIG. 6B is a side view of the contactor truck shown in FIG. 6A, illustrating an exemplary position of components operatively associated with the movable cradle according to embodiments of the present invention.
Figure 6C:
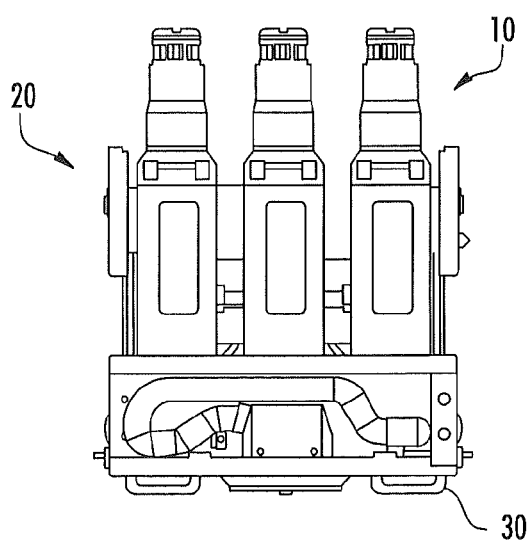
FIG. 6C is a top view of the contactor truck shown in FIG. 6A.
Figure 7A:
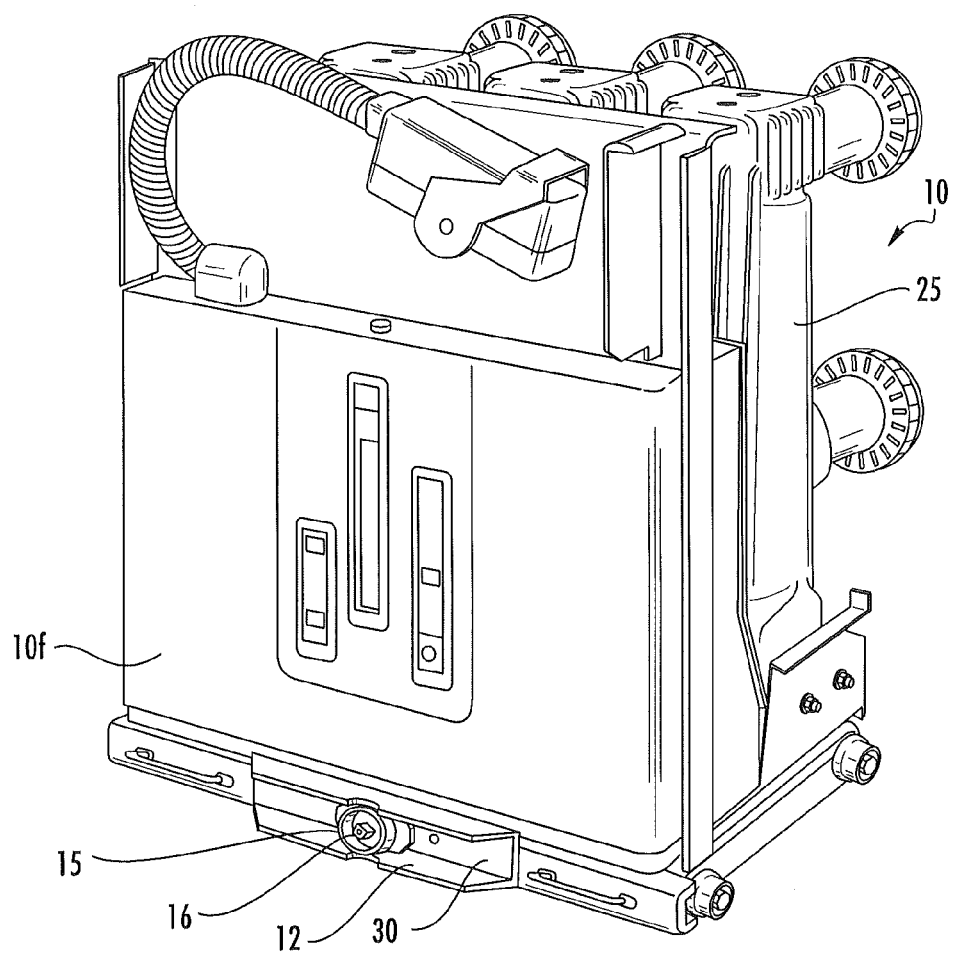
FIG. 7A is a front perspective view of a contactor truck with no door interlock according to embodiments of the present invention.

As shown in FIGS. 6A-6C, the cradle 30 is configured to move relative to a compartment 100c in the body of the switch gear (FIGS. 4A, 5A). As shown in FIG. 6C, the drive screw 40 can be movably coupled to a cross member 12. The drive screw 40 can enter an aperture 16 in a cylindrical body 15 which is movably coupled to the cross member 12. The motor 31, clutch 33 and gearbox 35 are typically fixed in position in the cradle 30 while the drive screw 40 extends and retracts through the cross member 12 to move the cradle 30 between the desired operative and withdrawn positions. As shown in FIG. 6B, the cross member and screw 40 can extend a distance beyond a front panel of the contactor truck 10f but are normally flush with the front panel.

The electric breaker or switchgear 100 (FIGS. 4A, 5A) can be configured for AC or DC operation. In some embodiments, the breaker or switchgear 100 can be configured as a medium voltage motor control center (MCC). However, it is contemplated that the automated levering-in cradle 30 may be used for other circuits and circuit breaker configurations.

In some embodiments, the cradle 30 can be configured to movably support switching devices 25 with weights between about 250-2000 pounds. The switchgear or breakers 100 can be medium voltage type units, e.g., about 5 kV, 7.2 kV, 15 kV, 12 kV, 17.5 kV, 24 kV, 38 kV and the like.

The switching device 25 can be a multi-phase vacuum contactor but other current interrupters configurations may be used. Typically, the multi-phase vacuum contactor has a three-phase configuration but other numbers of phases can be used.

FIGS. 7A-7L illustrate different circuit breaker door interlock or door non-interlock options for the contactor trucks 10 with motorized levering-in according to embodiments of the present invention. FIGS. 7A-7D illustrate the cradle 30 with no door interlock. FIGS. 7E-7H show the cradle 30 of the contactor truck 10 with a door interlock 90. In this embodiment, the door interlock 90 can comprises a mechanical lever that interfaces or engages with a component in the switchgear 100 to lock the door in certain operational conditions. FIGS. 7I-7L illustrate an interlock 90 having a pin-capture 90p door interlock configuration that interfaces or engages with a component in the switchgear 100 to lock the door in certain operational conditions according to embodiments of the present invention.

Figure 8A:
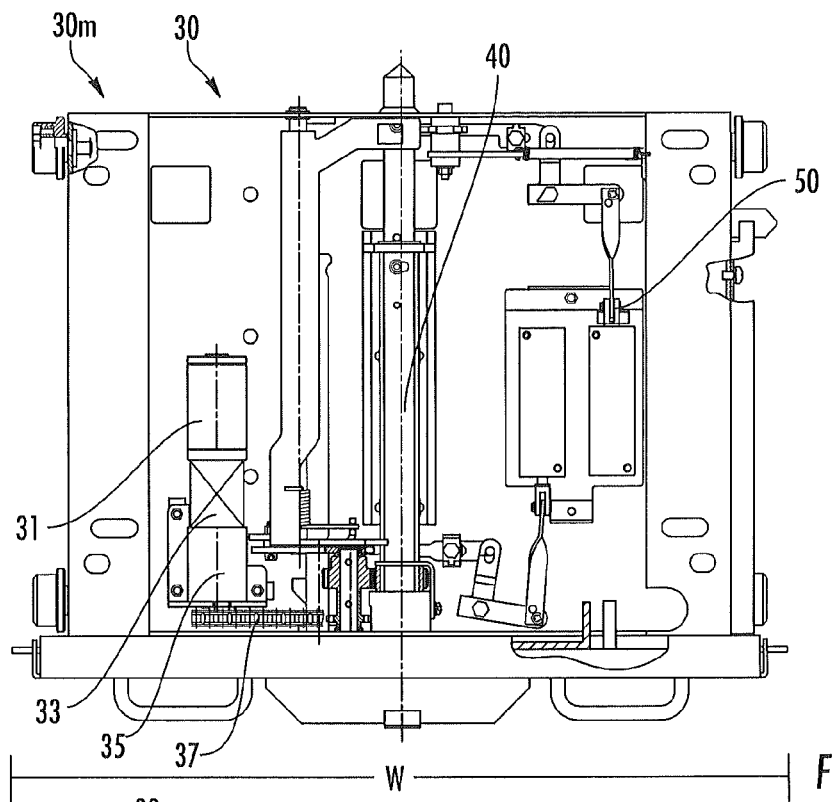
Figure 8B:
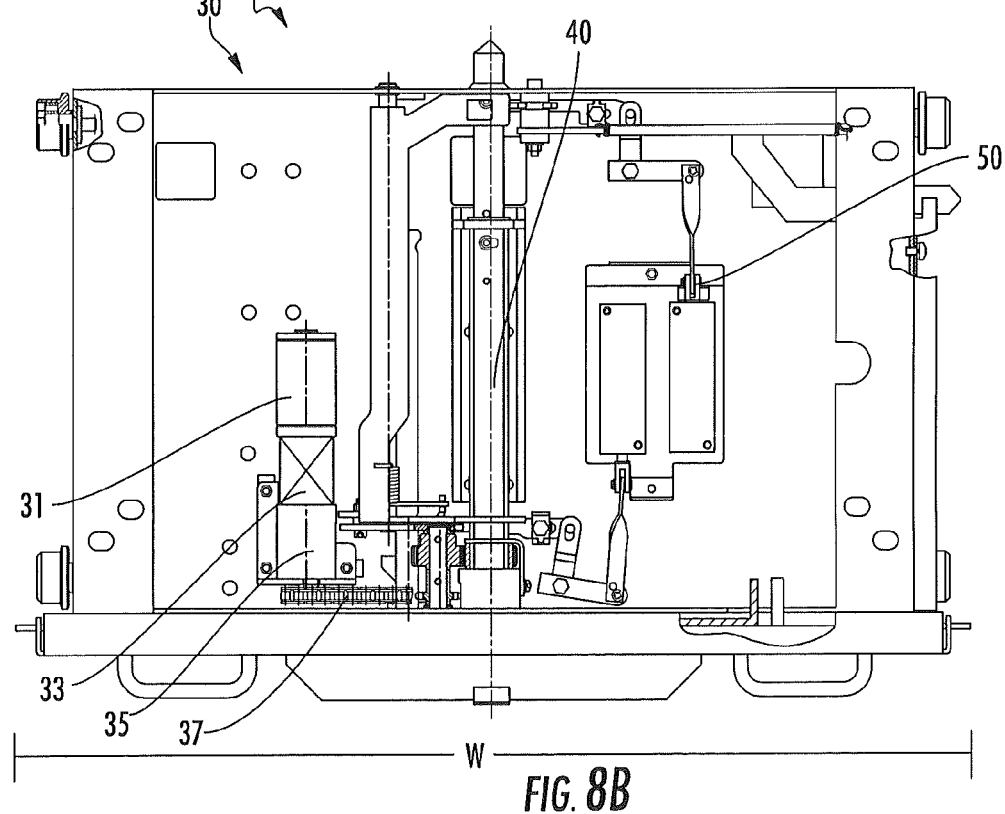

FIGS. 8A-8C are schematic top view illustrations of cradles 30 of different size widths W with integrated automated drives 30m with electric motors 31. The sizes can include widths W that are small (typically about 600 mm), medium (typically about 800 mm) and large (typically about 1000 mm). Each truck cradle 30 can also have the same or substantially the same length L. Each cradle 30 can have substantially the same depth (height).

The cradles 30 can be configured to accommodate or allow the same or different travel lengths between service and test (levering-in and withdrawn) positions inside a respective compartment 100c (FIG. 4A). In some embodiments, the travel distance can be about 200 mm for a 12/17.5 kV unit while a larger voltage rated unit (e.g., about 24 kV) may have a travel distance of about 300 mm.

In each size, the motor 31, clutch 33, gearbox 35, and drive assembly 37 can be located on a common side of the cradle (shown as the left side). However, the motorized drive system 30m can be distributed or placed in different locations.

Figure 9A:
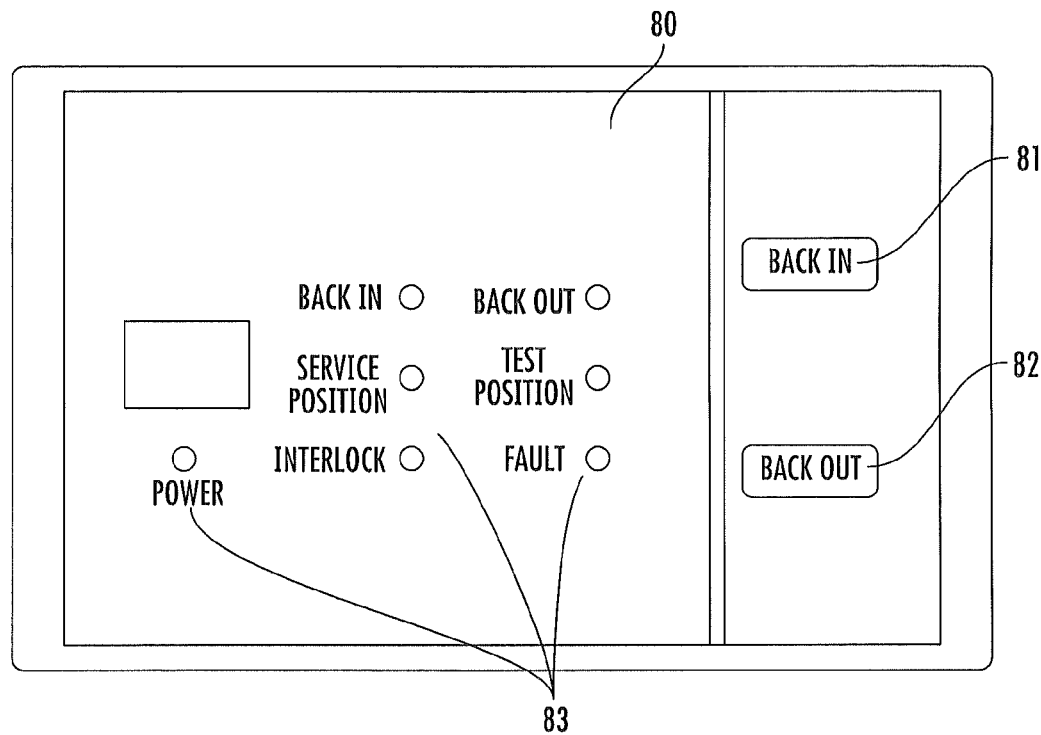
FIG. 9A is a front view of an example of an electronic relay controller for controlling the motorized levering-in cradle according to embodiments of the present invention.
Figure 9B:
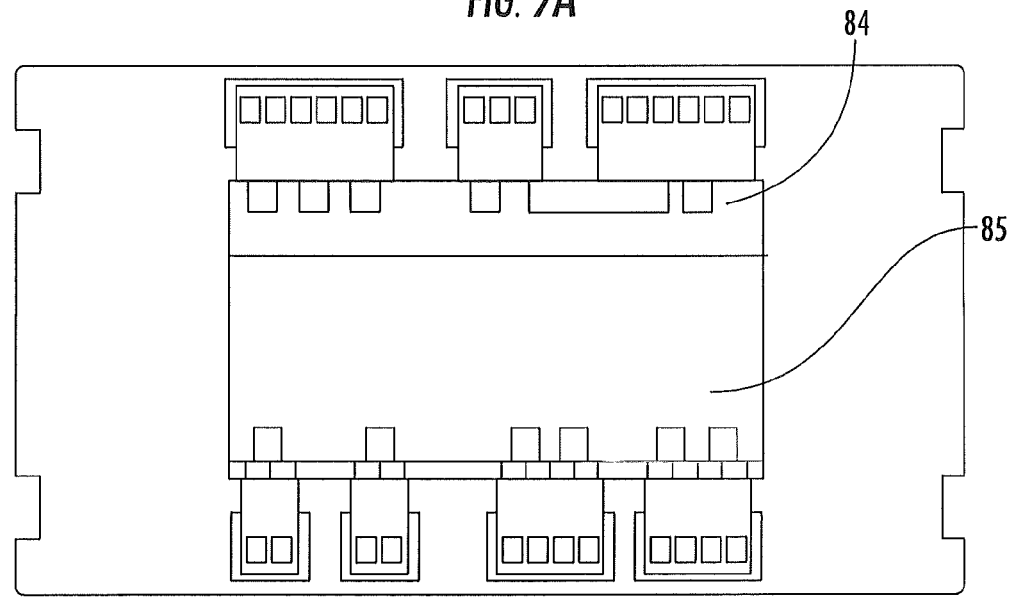
FIG. 9B is an internal view of examples of components of the controller shown in FIG. 9A.

FIG. 9A is a front view of an example of an electronic relay controller 80 for controlling the motorized levering-in cradle 30 according to embodiments of the present invention. The controller 80 can have a user interface (UI) with a "rack in" 81 and "rack out" 82 input selection and various indicators 83 associated with the status of the cradle 81. FIG. 9B is an internal view of examples of circuit components 84, 85 that allow the inputs 81, 82 and status indicators 83 of the controller 80 shown in FIG. 9A. The controller 80 and associated control circuit can protect the motor 31 from being burnt provide anti jamming capability and provide an easy to use UI. However, these figures are merely shown by way of example as other configurations of controllers and control circuits may be used to control the drive motor 31.

Figure 10:
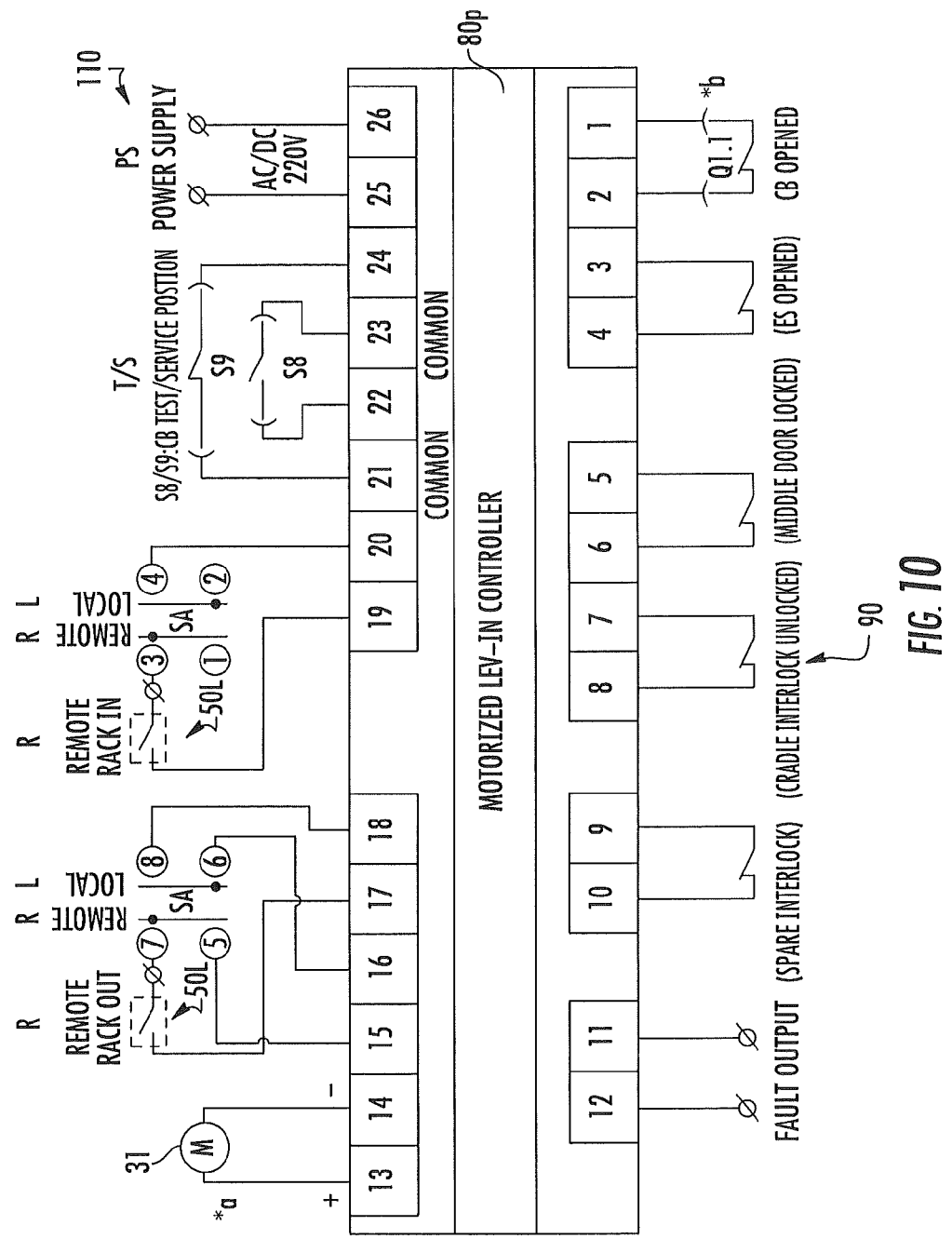
FIG. 10 is a schematic of an exemplary circuit for motorized levering-in operation according to embodiments of the present invention.
Figure 17:
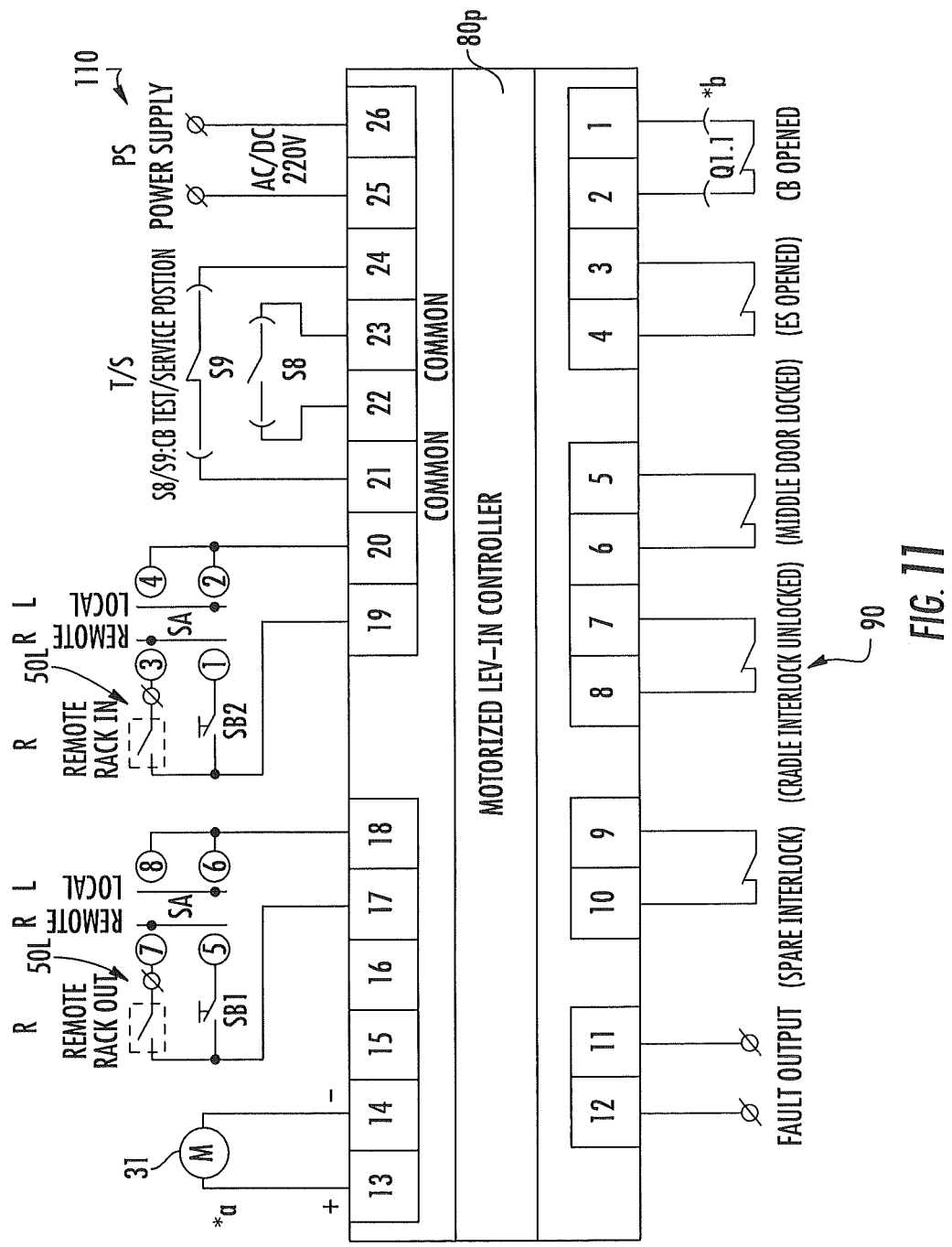

FIGS. 10 and 11 are schematics of a control circuit 110 for motorized levering-in using a controller 80 comprising at least one processor 80p for motorized levering-in operation according to embodiments of the present invention. As shown, the circuit 110 comprises a controller provided by a processor 80p what includes terminals that connect drive motor 31, limit switches 50L for local and remote (L and R) rack in and rack out operation, test and service switches T/S, a power supply PS, cradle interlock 90 (for locking and unlocking) and the like. The "*a" and "*b" references in the schematics refer to normally connected and normally disconnected states of the contacts. However, these figures are merely shown by way of example as other configurations of controllers and control circuits may be used to control the drive motor 31 and other types of motors can be used including, for example, slot motors and linear motors.

Figure 12:
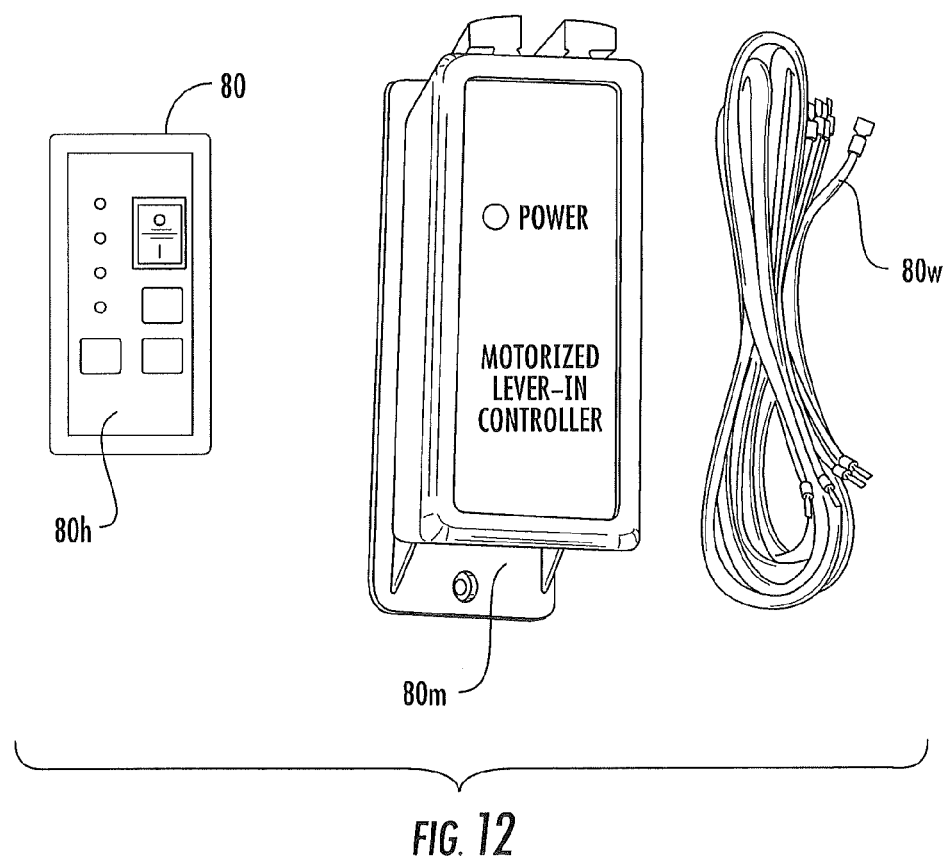
FIG. 12 is a front view of exemplary handcart and main unit electronic digital controllers that may be wired and/or wireless to control the motorized levering-in according to embodiments of the present invention.

FIG. 12 is a front view of a handcart controller 80h and main unit electronic digital controller 80m that may be wired (80w) and/or wireless to control the motorized levering-in of the cradle 30 and associated truck 10 according to embodiments of the present invention.

Figure 13:
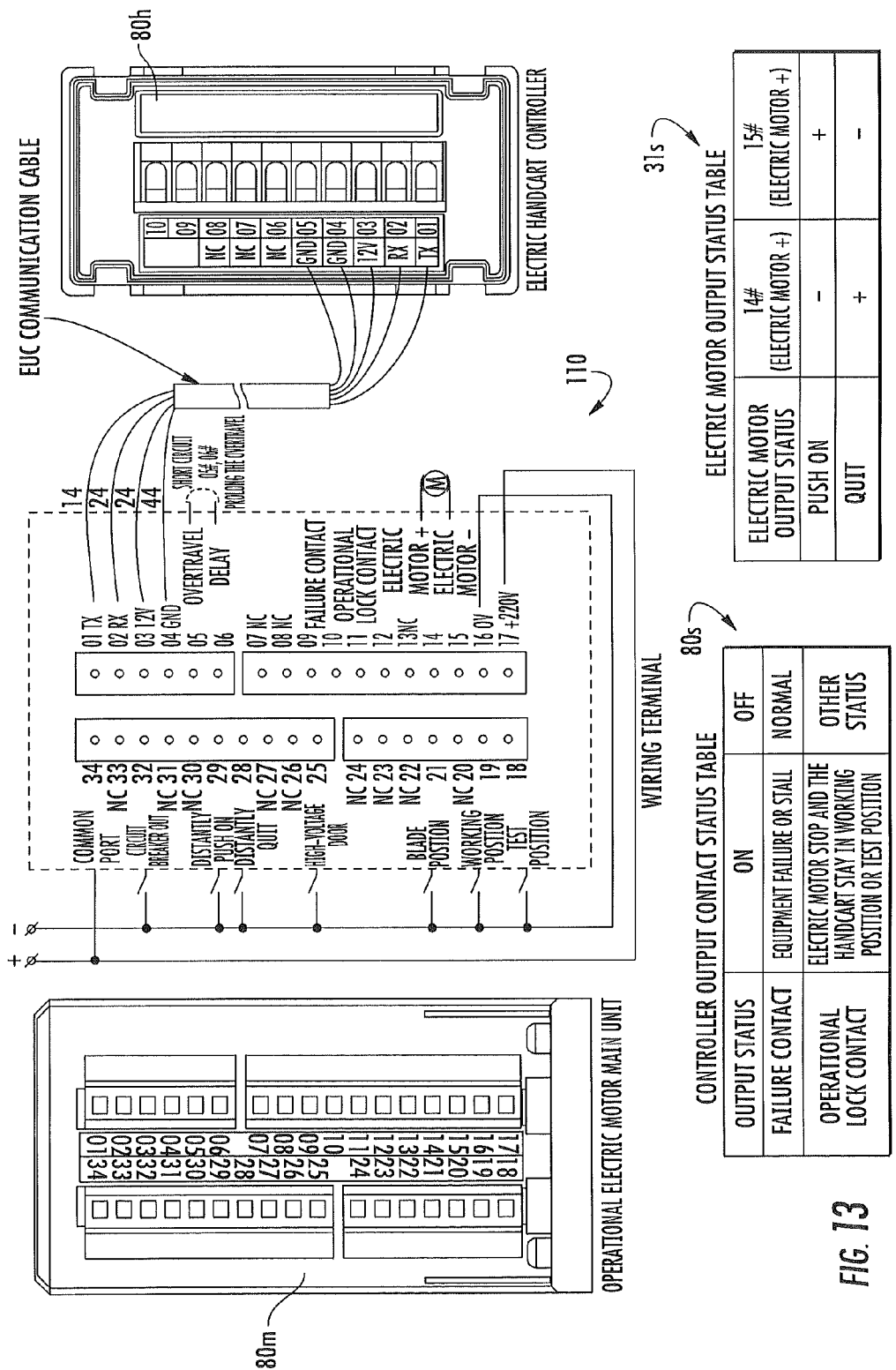
FIG. 13 is a schematic illustration of an exemplary wiring circuit for the handcart controller and the main unit according to embodiments of the present invention.

FIG. 13 is a schematic illustration of a control circuit 110 for the remote (e.g., handcart) controller 80h and the main unit controller 80m according to embodiments of the present invention. FIG. 13 also illustrates status tables for the controller output contacts 80s and the electric motor output 31s. However, this figure is merely shown by way of example as other configurations of controllers and control circuits may be used to control the drive motor 31.

Figure 14:
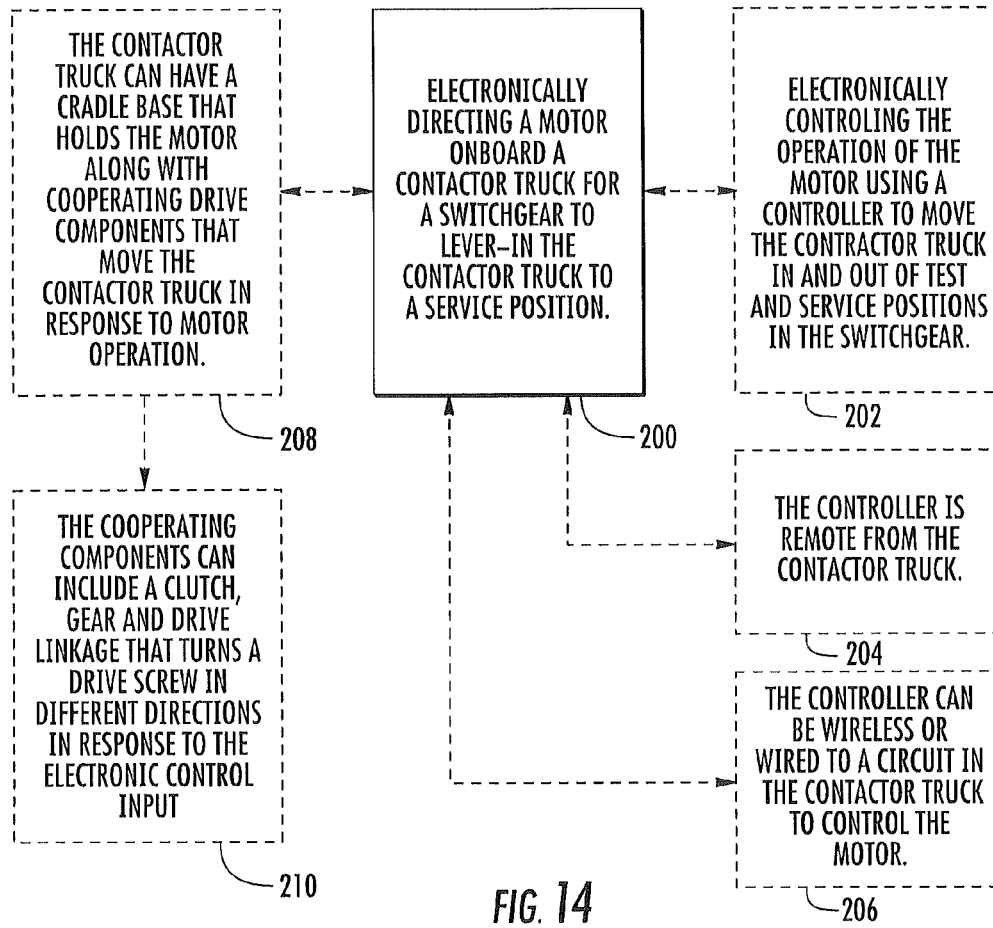
FIG. 14 is a flow chart of a method of moving a withdrawable contactor truck having an integral motor for levering-in according to embodiments of the present invention.

FIG. 14 is a flow chart of a method of moving a withdrawable contactor truck having an integral motor for levering-in according to embodiments of the present invention. The method includes electronically directing a motor onboard a contactor truck for a switchgear to lever-in the contactor truck to a service position (block 200).

The method can be carried out by electronically controlling the operation of the motor using at least one controller to move the contactor truck in and out service and test positions in of the switchgear (block 2020).

The controller can be remote from the contactor truck (block 204).

The controller can be wireless or wired to a circuit in the contactor truck to control the motor (block 206).

The controller can be an electronic or analog controller or can include both analog and electronic controllers.

The contactor truck can have a cradle base that holds the motor along with cooperating drive components that move the contactor truck in response to motor operation (block 208)

The cooperating components can include a clutch, gear and drive linkage that turns a drive screw in different directions in response to the electronic control input (block 210).

Figure 15:
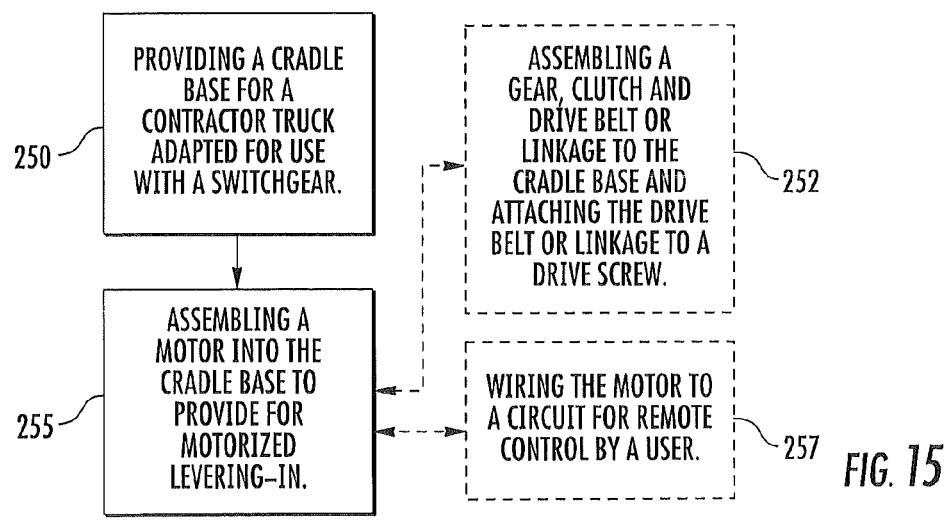
FIG. 15 is a flow chart of a method of assembling a cradle base assembly for a contactor truck according to embodiments of the present invention.

FIG. 15 is a flow chart of a method of assembling a cradle assembly for a contactor truck according to embodiments of the present invention. A cradle base for a contactor truck adapted for use with a switchgear is provided (block 250).

An electric motor is assembled into/onto the cradle base to provide for motorized levering-in (block 255).

A gear, clutch and drive belt or linkage can be assembled to the cradle base and attaching the drive belt or linkage to a drive screw (block 252).

The motor can be wired to a circuit for remote control by a user (block 257).

Figure 16:
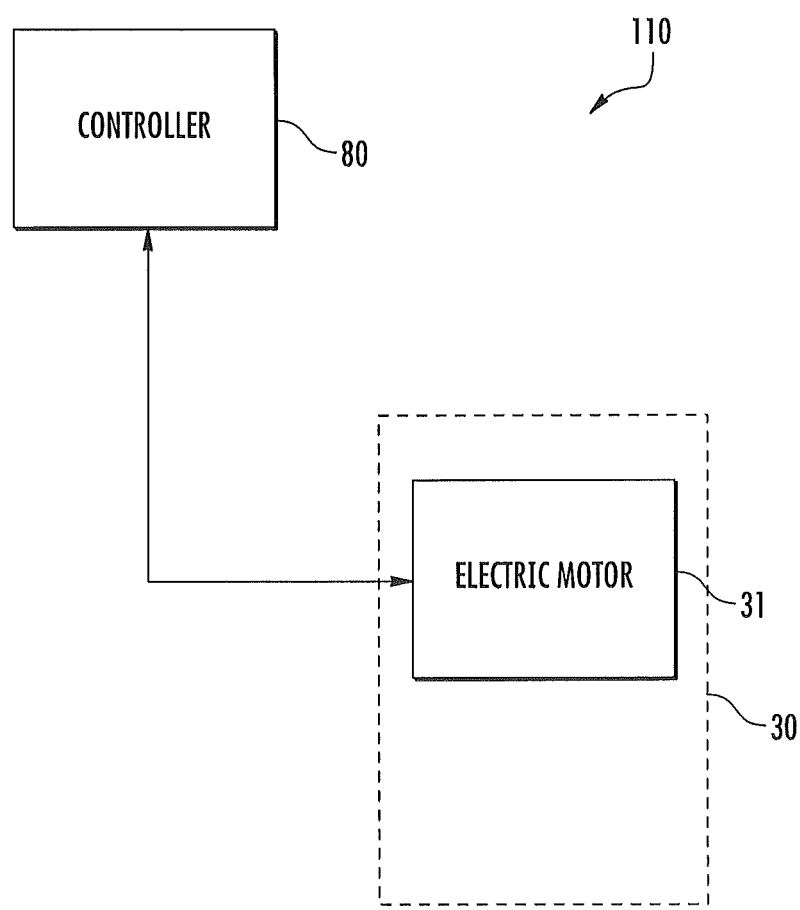
FIG. 16 is a schematic illustration of a control circuit according to embodiments of the present invention.

FIG. 16 is a schematic illustration of a control circuit according to embodiments of the present invention. Embodiments of the present invention may software and hardware aspects, all generally referred to herein as a "circuit" or "module." Software operation may be implemented using discrete hardware components, one or more Integrated Circuits (IC), analog devices, application specific integrated circuits (ASICs), or a programmed digital signal processor or microcontroller.

Where used, the processor 80p can be commercially available or custom microprocessor, microcontroller, digital signal processor or the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A withdrawable contactor truck for a circuit breaker, comprising:
   a cradle comprising a front wall, right and left sidewalls attached to the front wall, the front wall, the back wall and the right and left sidewalls have a height dimension that is about 1.5 inches;
   a motorized drive system comprising an electric motor in the cradle, wherein the electric motor has a body with a height dimension that is under the height dimension of the cradle, wherein the motorized drive system moves the contactor truck in a path between a withdrawn position and a levering-in position in a circuit breaker, wherein the electric motor resides a distance away from a front of the cradle, separated by and attached to a gear box which drives a laterally extending belt or linkage to turn a longitudinally extending drive screw of the motorized drive system, wherein the longitudinally extending drive screw extends in a front to back direction of the cradle, orthogonal to the front wall of the cradle, wherein the laterally extending belt or linkage extends parallel to the front wall of the cradle, and wherein the drive screw extends in a horizontal orientation along a longitudinally extending centerline of the cradle; and a plurality of external wheels attached to the cradle, at least two of the wheels adjacent the right sidewall and at least two of the wheels adjacent the left sidewall, wherein the wheels have a center of rotation closer to a bottom of the right and left sidewalls than a top of the right and left sidewalls, and wherein an outer diameter of a top of the wheels reside below the top of the right and left sidewalls while an outer diameter of a bottom of the wheels reside adjacent and below the bottom of the right and left sidewalls.

2. The contactor truck of claim 1, wherein the cradle further comprise a back wall behind the front wall and attached to the right and left sidewalls, wherein the back wall has a maximal height dimension that is about 1.5 inches, wherein the right and left sidewalls have a fixed length, and wherein the wheels are metal.

3. The contactor truck of claim 1, wherein the cradle has a cross-member with a center cylindrical aperture, and wherein the cross member and the drive screw can extend a distance beyond a front panel of the contactor truck.

4. The contactor truck of claim 1, wherein the withdrawable contactor truck is for an electric switchgear, the contactor truck further comprising a switchgear door interlock held by a front portion of the cradle.

5. The contactor truck of claim 1, wherein the motorized drive system comprises a clutch attached to the gearbox and held in the cradle in communication with the motor to be able to make the motorized drive system controllably travel in forward and reverse directions, wherein the clutch slips/gives at a predefined force, and wherein the motorized drive system has sufficient torque to automatically drive the truck fully into a switchgear position within about 1-300 seconds.

6. The contactor truck of claim 1, wherein the contactor truck is in communication with a remote and/or onboard at least one controller that is in communication with the motorized drive system for allowing a user to remotely control the motorized drive system to direct the motorized drive system to move to the withdrawn position and the levering-in position.

7. The contactor truck of claim 1, further comprising at least one position sensor held in the cradle in communication with the motorized drive system.

8. The contactor truck of claim 1, further comprising a multi-phase switching device fixedly attached to the cradle, wherein the switching device resides over the cradle.

9. A cradle for withdrawable contactor trucks, comprising:
a cradle housing having upstanding right and left sidewalls with a fixed length attached to front and rear walls, the cradle housing having a maximal height dimension that is about 1.5 inches;
a plurality of spaced apart wheels residing adjacent and external to each of the right and left sidewalls;
an electric motor held in the cradle, wherein the electric motor has a body with a height dimension that is less than the height dimension of the cradle; and
a levering-in drive screw held in the cradle in communication with the electric motor, wherein the levering-in drive screw extends in a horizontal orientation along a longitudinally extending centerline of the cradle, wherein the cradle has a cross-member with a center cylindrical aperture, wherein the cross member and drive screw can extend a distance beyond a front panel of the contactor truck, wherein the plurality of wheels extend out of the left and right sidewalls with a center of rotation closer to a bottom of the right and left sidewalls than a top of the right and left sidewalls, and wherein an outer diameter of a top of the wheels reside below the top of the right and left sidewalls while an outer diameter of a bottom of the wheels reside adjacent and below the bottom of the right and left sidewalls.

10. The cradle of claim 9, wherein the cradle has service and test levering-in positions inside a compartment and the travel distance is about 200 mm for a 12/17.5 kV unit and about 300 mm for a 24 kV unit.

11. The cradle of claim 9, further comprising a clutch held in the cradle in communication with the electric motor, wherein the clutch slips/gives at a predefined force.

12. The cradle of claim 11, further comprising:
a gear box held in the cradle attached to the clutch; and
a drive linkage or belt in the cradle attached to the gear box
wherein the levering-in drive screw is in communication with the electric motor through the drive linkage or belt.

13. The cradle of claim 9, wherein the electric motor is in communication with at least one controller that allows a user to remotely control motion of the motor to direct the cradle to move between a withdrawn position and a levering-in position in a circuit breaker.

14. The cradle of claim 12, further comprising at least one position sensor held in the cradle in communication with the drive screw, and wherein the motorized drive system has sufficient torque to drive the cradle fully into a switchgear position within about 1-300 seconds.

15. An electric switchgear comprising:
a housing having at least one interior compartment and a door;
a withdrawable contactor truck comprising (i) a cradle with a height of about 1.5 inches, and wherein the cradle comprises a plurality of wheels residing outside and adjacent right and left sidewalls, (ii) a motorized levering-in drive system with an electric motor, clutch and levering-in screw held in the cradle, all under the height of the cradle, wherein the clutch slips/gives at a predefined force in the cradle, and (iii) a multi-phase switching device held above the cradle; and
at least one controller remote from the contactor truck in communication with the motorized drive system,
wherein the motorized drive system moves the contactor truck in a path between a withdrawn position and a levering-in connected position in the switchgear housing interior compartment, such that (i) in the levering-in connected position, each phase of the switching device is electrically connected to a corresponding electrical conductor and (ii) in the withdrawn position, each phase of the switching device is electrically separated from the corresponding electrical conductor, and wherein the motorized drive system has sufficient torque to drive the truck from the withdrawn position to fully into the connected position within about 1-300 seconds,
wherein the cradle has a cross-member with a center cylindrical aperture, and wherein the cross member and drive screw can extend a distance beyond a front panel of the contactor truck, wherein the plurality of wheels extend out of the left and right sidewalls with a center of rotation closer to a bottom of the right and left sidewalls than a top of the right and sidewalls, and wherein an outer diameter of a top of the wheels reside below the top of the right and left sidewalls while an outer diameter of a bottom of the wheels reside adjacent and below the bottom of the right and left sidewalls.

16. The switchgear of claim 15, further comprising a user interface in communication with the at least one controller, the user interface comprising rack in, rack out, test position and service position options for a user to select to operate the levering-in drive system.

17. The switchgear of claim 15, further comprising a handcart controller comprising or in communication with the at least one controller to control the motorized levering-in of the cradle.

18. An electric switchgear comprising:
a housing having at least one interior compartment and a door;
a withdrawable contactor truck comprising (i) a cradle with a height of about 1.5 inches, and wherein the cradle comprises a plurality of wheels residing outside and adjacent right and left sidewalls, (ii) a motorized levering-in drive system with an electric motor, clutch and levering-in screw held in the cradle, all under the height of the cradle, wherein the clutch slips/gives at a predefined force in the cradle, and (iii) a multi-phase switching device held above the cradle; and
at least one controller remote from the contactor truck in communication with the motorized drive system,
wherein the motorized drive system moves the contactor truck in a path between a withdrawn position and a levering-in connected position in the switchgear housing interior compartment, such that (i) in the levering-in connected position, each phase of the switching device is electrically connected to a corresponding electrical conductor and (ii) in the withdrawn position, each phase of the switching device is electrically separated from the corresponding electrical conductor, and wherein the motorized drive system has sufficient torque to drive the truck from the withdrawn position to fully into the connected position within about 1-300 seconds,
wherein the cradle housing has a front wall and a back wall attached to the right and left sidewalls, and wherein the front wall, back wall and right and left sidewalls of the cradle have a maximal height of 1.5 inches, wherein the plurality of wheels extend out of the left and right sidewalls with a center of rotation closer to a bottom of the right and left sidewalls than a top of the right and left sidewalls, and wherein an outer diameter of a top of the wheels reside below the top of the right and left sidewalls while an outer diameter of a bottom of the wheels reside adjacent and below the bottom of the right and left sidewalls.

19. A cradle for withdrawable circuit breaker products, comprising:
a cradle comprising a front wall, right and left sidewalls attached to the front wall, the front wall, the back wall and the right and left sidewalls have a fixed length and a height dimension that is about 1.5 inches; and
a motorized drive system comprising an electric motor in the cradle, wherein the electric motor has a body with a height dimension that is under the height dimension of the cradle, wherein the motorized drive system moves the contactor truck in a path between a withdrawn position and a levering-in position, and wherein the electric motor resides a distance away from a front of the cradle, separated by and attached to a gear box which drives a laterally extending belt or linkage to turn a longitudinally extending drive screw of the motorized drive system, wherein the longitudinally extending drive screw extends in a front to back direction of the cradle, orthogonal to the front wall of the cradle, wherein the laterally extending belt or linkage extends parallel to the front wall of the cradle, and wherein the drive screw extends in a horizontal orientation along a longitudinally extending centerline of the cradle; and
a plurality of external wheels attached to the cradle, at least two of the wheels adjacent the right sidewall and at least two of the wheels adjacent the left sidewall, wherein the wheels have a center of rotation closer to a bottom of the right and left sidewalls than a top of the right and left sidewalls, and wherein an outer diameter of a top of the wheels reside below the top of the right and left sidewalls while an outer diameter of a bottom of the wheels reside adjacent and below the bottom of the right and left sidewalls.

20. The circuit breaker product of claim 19, wherein the motorized drive system has sufficient torque to automatically drive the cradle fully into a retracted position within about 1-300 seconds.

* * * * *

UNITED STATES PATENT AND TRADEMARK OFFICE
CERTIFICATE OF CORRECTION

PATENT NO. : 9,673,595 B2
APPLICATION NO. : 14/068463
DATED : June 6, 2017
INVENTOR(S) : Benke et al.

Page 1 of 1

It is certified that error appears in the above-identified patent and that said Letters Patent is hereby corrected as shown below:

In the Claims

Column 13, Claim 15, Line 2: delete "and sidewalls," and insert -- and left sidewalls, --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*